United States Patent [19]

Beitchman et al.

[11] 4,314,037

[45] Feb. 2, 1982

[54] HETERO NITROGEN CATALYSTS

[75] Inventors: Burton D. Beitchman, Springfield; Rocco L. Mascioli, Media, both of Pa.

[73] Assignee: Air Products and Chemicals, Inc., Allentown, Pa.

[21] Appl. No.: 216,043

[22] Filed: Dec. 15, 1980

[51] Int. Cl.$^3$ .................. C08G 18/14; C08G 18/20
[52] U.S. Cl. ................................................ 521/125
[58] Field of Search ....................................... 521/125

[56] References Cited

U.S. PATENT DOCUMENTS 4,101,465  7/1978  Lockwood et al. ............... 521/125
4,256,841  3/1981  Horacek et al. .................. 521/125

*Primary Examiner*—Maurice J. Welsh
*Attorney, Agent, or Firm*—Richard A. Dannells, Jr.; E. Eugene Innis; James C. Simmons

[57] ABSTRACT

In the production of cellular products by reaction of polyols with organic isocyanates, alkali metal salts of acidic azoles are employed as all or part of the tertiary amine catalyst for promoting the reaction. Alkali metal salts of tolyltriazole are designated in the preferred examples for production of polyurethane and polyisocyanurate foam products.

14 Claims, No Drawings

HETERO NITROGEN CATALYSTS

The present invention relates to the production of cellular polymeric products by the reaction of organic polyisocyanates with one or more polyols in the presence of catalyst, as in the production of polyurethane and isocyanurate foams, and is particularly concerned with the use of novel tertiary amine type catalysts in formulations for production of such foams.

BACKGROUND OF THE PRIOR ART

The use of tertiary amines and certain organotin compounds, separately or in combination, as catalysts in the production of polyurethanes and polyisocyanurates is well known in the art. Among the more commonly employed tertiary amine catalysts are included triethylenediamine, N,N-dimethylcyclohexylamine, dimethylethanol amine, tetramethylbutane diamine, and N-methyl- and N-ethylmorpholine.

BRIEF SUMMARY OF THE INVENTION

It has now been found that alkali metal salts of certain tertiary amine compounds having acidic hydrogen atoms are highly efficient as catalysts in formulations for production of polyurethane foams and useful in polyisocyanurate foams, when used alone or in combination with other known catalysts. The novel catalysts of the invention compare favorably with the leading known commercial urethane catalysts hitherto employed, particularly for the preparation of low density polyurethane rigid foams which foams find wide use in refrigeration application. The preferred catalysts of the invention are the alkali metal salts of tolyltriazole (C-methyl benzotriazole) corresponding in general to the formula:

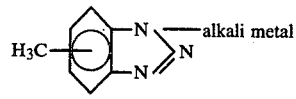

DETAILED DESCRIPTION OF THE INVENTION

The alkali metal salts of the azole compounds employed in practice of the invention are readily prepared by reaction of the azole compound containing an acidic hydrogen atom, with an alkali metal hydroxide. Generally, the azole compound is dissolved in suitable organic solvent and concentrated aqueous alkali metal hydroxide slowly added thereto in increments while stirring the reaction mixture.

In preparing the salts it is desirable to use stoichiometric equivalents of base and azole compound or to have a slight excess of the azole.

The obtained alkali metal salts of the azoles may be benefically employed as catalysts in the usual formulations for production of various types of polyurethane foams, substituted wholly or partly for the tertiary amine catalysts theretofore employed.

EXAMPLE 1

13.46 parts by weight of commercial tolyltriazole was dissolved in 40 parts methanol, to which 11.2 parts of 50% potassium hydroxide was added dropwise while stirring. Water and methanol were flashed off and the residue further dried in a vacuum oven at 85° C. The obtained solids were ground and further dried for three hours.

To evaluate the catalyic properties of the obtained potassium salt of tolyltriazole (KTTA), it was dissolved in ethylene glycol and the performance of the obtained catalyst solution compared with commonly employed commercial catalysts in the same typical formulations. The results obtained are reported in Table I.

EXAMPLE 2

The sodium salt of tolyltriazole was prepared in a manner similar to the potassium salt of Example 1, except that 8 parts of 50% sodium hydroxide was used in place of the KOH solution. Evaluation of the activity of the sodium salt of tolyltriazole in solution in ethylene glycol is reported in Table I.

EXAMPLE 3

In another run the potassium salt of tolyltriazole in solution in ethylene glycol was prepared without requiring flash removal of solvent, as described below.

13.3 parts of tolyltriazole (TTA) were dissolved in 17.1 parts of ethylene glycol with warming to 50° C. A solution of KOH comprising 5.6 parts KOH in 17.1 parts ethylene glycol was similarly prepared. Both solutions remained stable on cooling to ambient temperature without precipitation of solids.

The tolyltriazole solution was then cooled in an ice bath and the KOH solution added to it. After stirring for half an hour the mixture of these solutions was bottled. Potentiometric titration of the bottled composition showed it to contain 27.4 parts of the potassium salt of tolyltriazole (89% of theoretical yield) and 2.57 parts of free tolyltriazole.

In initial screening studies employing a standard premix composition reactive with isocyanate to produce rigid polyurethane foam, 0.5 parts of the KTTA catalyst was found to be equivalent in activity to 0.8 parts of a widely employed commercial catalyst (Polycat 8) compared as a control. In the same formulations the sodium salt of tolyltriazole (NaTTA) at 0.375 parts was equal in activity to 0.8 parts of the control catalyst. The results are tabulated in Table I below. The KTTA was employed as a solution comprised of 2.5 parts of the catalyst (Example 1) in 5 parts of ethylene glycol (33.3% solution); the NaTTA solution was made up of 2.5 parts catalyst (Example 2) in 7.5 parts ethylene glycol (25% solution).

TABLE I

| PREMIX | pbw |
|---|---|
| *Selectrofoam 6406 | 109.0 |
| Silicone cell stabilizer - (DC193) | 1.5 |
| Fluorocarbon blowing agent - (R-11B) | 47.0 |
| | 157.5 |

The premix was blended with 105 parts of the isocyanate (Hylene TIC) and the catalyst mixed in. The results are tabulated below:

| CATALYST | | | | |
|---|---|---|---|---|
| Polycat 8 (pbw) | 0.8 | | | |
| KTTA (33.3% solution) (pbw) | | 1.5 | 1.5 | |
| NaTTA (25% sol'n) (pbw) | | | | 1.5 |
| Portion active | 0.8 | 0.5 | 0.5 | 0.375 |
| Time in sec. | | | | |
| Initiation | 13 | 14.5 | 14.0 | 13.5 |
| String Gel | 50 | 45 | 40 | 45 |
| Tack Free | 60 | 60 | 60 | 65 |

TABLE I-continued

| Rise | 105 | 100 | 100 | 100 |

*Selectrofoam 6406 is a high functionality polyol from sucrose and an amine, marketed by PPG.

In the same formulation as in Table I tolyltriazole alone showed little or no catalystic activity.

TABLE II
EVALUATION OF KTTA CATALYST

A standard rigid premix formulation was employed comprising

|  | pbw |
|---|---|
| Multranol E4063[1] | 100 |
| R 11B[2] | 44.8 |
| Distilled water | 0.9 |
|  | 145.7 |
| to which there was added |  |
| UL8 (50% in DOP)[3] | 0.3 |
| catalyst (as indicated) |  |
| To the above premix composition there was added |  |
| MONDUR-437[4] | 124.3 |

| CATALYST |  |  |  |  |  |  |  |  |
|---|---|---|---|---|---|---|---|---|
| [5]Polycat 8 | 1.4 | 1.8 |  |  | 1.4 | 1.8 |  |  |
| 27.4% solution |  |  |  |  |  |  |  |  |
| KTTA in EG |  |  | 1.7 | 2.2 |  |  | 1.7 | 2.2 |
| (Example 3) |  |  |  |  |  |  |  |  |
| Active catalyst | 1.4 | 1.8 | .47 | 0.6 | 1.4 | 1.8 | .47 | 0.6 |
| Hood temp. °F. | 78 | 78 | 79 | 79 | 79 | 78 | 78 | 79 |
| (= °C.) | (25.6) | (25.6) | (26) | (26) | (26) | (25.6) | (25.6) | (26) |
| Polyol temp. °F. | 76 | 76 | 76 | 76 | 76 | 76 | 76 | 76 |
| (= °C.) | (24.4) | (24.4) | (24.4) | (24.4) | (24.4) | (24.4) | (24.4) | (24.4) |
| Isocyanate °F. | 75 | 75 | 75 | 75 | 76 | 76 | 76 | 76 |
| (= °C.) | (23.9) | (23.9) | (23.9) | (23.9) | (24.4) | (24.4) | (24.4) | (24.4) |
| Initiation time (sec) | 7 | 6 | 7 | 6 | 7 | 6 | 6 | 6 |
| String gel time (sec) | 26 | 24 | 29 | 25 | 26 | 24 | 28 | 24 |
| Tackfree time (sec) | 70 | 60 | 85 | 80 | 65 | 63 | 79 | 74 |
| Rise time (sec) | 80 | 75 | 95 | 85 | 75 | 80 | 94 | 83 |

[1]Multranol E4063 is a polyether polyol, avg. OH#470 (Mobay Chemical).
[2]R-11B is trichlorofluoromethane (duPont).
[3]UL8 is an organotin carboxylate (Witco Chemical).
[4]Mondur E-437 is toluene diisocyanate prepolymer-amine equivalent 133 (Mobay Chemical).
[5]Polycat 8 is N,N-dimethylcyclohexyl amine (Abbott Laboratories).

From the results above reported, it is noted that about 0.6 parts of the active potassium salt of tolyltriazole was found to be equivalent to 1.8 parts of the control catalyst (Polycat 8).

In standard formulations for production of one-shot appliance foams KTTA was found to be more active that the compared commercial tertiary amine catalyst largely employed in such formulations. To obtain comparable activities at the low level of KTTA solution (0.4 parts) 75% more of the control catalyst (Polycat 8) was needed; at the high level of catalyst (0.7 parts KTTA) 43% more of Polycat 8 was needed. The results are tabulated in Table III.

The formulation employed was comprised of:

|  | pbw |
|---|---|
| [6]Pluracol 595 | 100 |
| [7]Tegostab B1048 | 1.5 |
| [8]T-12 (10% in DOP) | 0.9 |
| [9]R-11 SBA | 43. |
| [10]Hylene TIC | 87.2 |
| Amine Catalyst | as indicated |
| Premix temperature | 77° F. (25° C.) |
| Isocyanate temperature | 77° F. (25° C.) |
| Room temperature | 78° F. (25.6° C.) |

TABLE III
One Shot Foam Systems

| Amine Catalyst |  |  |  |  |  |  |  |  |  |
|---|---|---|---|---|---|---|---|---|---|
| Polycat 8 | None | None | 0.2 |  | 0.4 |  | 0.7 |  | 1.0 |
| KTTA (30% in EG) |  |  |  | 0.2 |  | 0.4 |  | 0.7 | 1.0 |
| Quantity active cat. |  |  | 0.2 | 0.06 | 0.4 | 0.12 | 0.7 | 0.21 | 1.0 | 0.3 |
| Time (secs) |  |  |  |  |  |  |  |  |  |
| Cream | 13 | 13 | 13 | 13 | 12 | 11 | 10 | 9 | 9 | 5 |
| Gel | 38 | 37 | 38 | 37 | 35 | 31 | 31 | 27 | 29 | 24 |
| Tack-free | 75 | 75 | 68 | 72 | 59 | 60 | 64 | 61 | 58 | 47 |
| Rise | 125 | 124 | 124 | 119 | 119 | 114 | 113 | 118 | 115 | 93 |

[6]Pluracol 595 is a polyetherpolyol, OH NO. 420 (BASF-Wyandotte).
[7]Tegostab B1048 is a rigid foam surfactant (Goldschmidt).
[8]T-12 is dibutyltin dilaurate
[9]R-11 SBA is stabilized trichlorofluoromethane (Allied Chemical).
[10]Hylene TIC is crude toluene diisocyanate, amine equivalent 165 (duPont)

In rigid one-shot formulations employing triethylenediamine as co-catalyst with organotin catalyst, the addition thereto of KTTA was again found to be more effective than Polycat 8, 43% more of the latter being required to obtain comparable catalyst activity, as seen from Table IV. The results in this Table also illustrate the increase in activity of KTTA obtained by addition of triethylene diamine.

The formulation employed comprised:

|  |  | pbw |
|---|---|---|
| Pluracol 595 |  | 100 |
| [11]DC 193 |  | 2.0 |
| R-11B |  | 43. |
| T-12 (10% in DOP) |  | 0.9 |
| Hylene TIC |  | 87. |
| Catalyst |  | as indicated |
| Premix temp. | 76° F. | (24.4° C.) |
| Isocyanate temp. | 75–78° F. | (24–25.6° C.) |
| Room temp. | 80° F. | (26.7° C.) |

TABLE IV

| CATALYST |  |  |  |  |  |  |  |  |  |
|---|---|---|---|---|---|---|---|---|---|
| Polycat 8 | 0.4 |  |  | 0.7 |  |  | 1.0 |  |  |
| [12]DABCO R-8020 |  | 0.4 |  |  | 0.7 |  |  | 1.0 |  |
| KTTA (30% in EG) Plus DABCO crystal (76/24) |  |  | 0.4 |  |  | 0.7 |  |  | 1.0 |
| Active Catalyst | 0.4 | 0.4 | 0.19 | 0.7 | 0.7 | 0.33 | 1.0 | 1.0 | 0.47 |
| Time (sec) |  |  |  |  |  |  |  |  |  |
| Cream | 8 | 7 | 7 | 8 | 6 | 6 | 7 | 5 | 5 |
| Gel | 34 | 30 | 28 | 31 | 27 | 24 | 27 | 25 | 22 |
| Tack-free | 80 | 70 | 68 | 67 | 61 | 54 | 60 | 53 | 45 |
| Rise | 99 | 90 | 80 | 86 | 77 | 73 | 78 | 68 | 58 |

[11]DC 193 is a silicone surfactant (Dow-Corning)
[12]DABCO R-8020 is a mixture of 80 parts dimethylethanolamine and 20 parts triethylenediamine (Air Products and Chemicals)

In rigid prepolymer appliance foam system (e.g. refrigerator insulation), using in the same formulations, the same amounts of Polycat 8 (neat) as compared to KTTA in 30% solution, the KTTA solution was found to be slower than the Polycat 8. By addition of triethylenediamine (DABCO®) to the KTTA solution the catalytic activity was enhanced, obtaining activities comparable to the Polycat-8 with slightly faster tack free and rise times. The several runs are reported in Table V.

anoate) or DABCO TMR-2 (hydroxypropyltrimethylammonium formate). As a co-catalyst in isocyanurate foam systems the effectiveness of KTTA is dependent upon the particular type of principal isocyanurate catalyst in the formulation. With TMR, KTTA is more effective as a co-catalyst than Polycat-8; however, this is not the case with TMR-2 or TMR-2/TMR (65–35) blends.

In flexible slab systems, the relative catalytic performance of KTTA as compared to other catalysts and catalyst blends is shown in the following tabulation:

| CATALYST | Parts php for equivalent rise time | active catalyst |
|---|---|---|
| DABCO-33LV | 0.25 | 0.825 |
| 29.7% KTTA | 0.35 | 0.1039 |
| 29.7% KTTA/33LV (1/1) | 0.34 | 0.106 |
| 29.7% KTTA/33LV (½) | 0.33 | 0.107 |
| 29.7% KTTA/A-1 (1/1) | 0.14 | 0.077 |
| 29.7% KTTA/A-1 (½) | 0.12 | 0.072 |
| *Niax A-1 | 0.08 | 0.56 |
| DMEA/33LV (1/1) | 0.35 | 0.233 |

*Niax A-1 is bis(dimethylaminoethyl)ether (U.C.C.)

Compared on a pound for pound Mill Cost basis KTTA and NaTTA compare favorably with presently used commercial catalyst such as triethylenediamine

TABLE V

|  | Formulation |  |
|---|---|---|
|  |  | ppw |
| Multranol E4063 |  | 100 |
| Water |  | 0.9 |
| R11B |  | 44.8 |
| UL-8 (50% in DOP) |  | 0.3 |
| Mondur E-437 |  | 124.3 |
| Catalyst |  | as indicated |

| Catalyst | Parts by Weight |  |  |  |  |  |  |  |  |
|---|---|---|---|---|---|---|---|---|---|
| Polycat-8 | 0.4 |  |  | 0.7 |  |  | 1.0 |  |  |
| DABCO R-8020 |  | 0.4 |  |  | 0.7 |  |  | 1.0 |  |
| KTTA (30% in EG) DABCO (76/24) |  |  | 0.4 |  |  | 0.7 |  |  | 1.0 |
| Active catalyst | 0.4 | 0.4 | 0.19 | 0.7 | 0.7 | 0.23 | 1.0 | 1.0 | 0.47 |
| Times (sec) |  |  |  |  |  |  |  |  |  |
| Cream | 13 | 13 | 13 | 13 | 13 | 13 | 11 | 12 | 10 |
| Gel | 40 | 43 | 45 | 42 | 45 | 43 | 36 | 35 | 35 |
| Tack free | 95 | 95 | 99 | 99 | 101 | 85 | 86 | 95 | 80 |
| Rise | 129 | 124 | 135 | 144 | 130 | 130 | 119 | 117 | 114 |

In isocyanurate foam systems at an isocyanate index of 500, KTTA used alone was not as effective as the prevalent commercially employed catalysts DABCO TMR (hydroxypropyltrimethylammonium-2-ethyl hexand N,N-dimethylcyclohexylamine (Polycat 8). In those formulations in which lesser amounts of KTTA can be used than either that of the triethylenediamine or the dimethylcyclohexylamine, the savings would be considerable even in instances in which the KTTA is blended with triethylenediamine.

While in the examples above the preparation and use of alkali metal salts of tolyltriazole are particularly set out, alkali metal salts of other azoles having an acidic hydrogen atom may be similarly prepared. Such alkali metal azole compounds should have activity in promoting reaction between organic isocyanates and polyol compounds, but not necessarily to the same degree as the preferred alkali metal tolyltriazoles. Examples of such azole compounds are: benzotriazoles, benzimidazoles and alkylbenzimidazoles, imidazoles, tetrazole; single ring triazoles such as 1, 2, 3, or 1, 2, 4 triazole, and other such azole compounds having at least two hetero nitrogen atoms.

What is claimed:

1. Compositions for the production of urethane and isocyanurate foam products by reaction of an organic polyisocyanate with a polyol in the presence of tertiary amine catalyst, characterized in that said tertiary amine catalyst is comprised wholly or partly of an alkali metal salt of an azole compound containing at least two hetero nitrogen atoms.

2. Compositions as defined in claim 1 wherein said tertiary amine catalyst comprises an alkali metal salt of tolyltriazole.

3. Compositions as defined in claim 1 wherein said tertiary amine catalyst comprises the potassium salt of tolyltriazole.

4. One-shot compositions for production of polyurethane foam comprising an organic polyisocyanate, polyol, blowing agent, cell stabilizer and tertiary amine catalyst, said catalyst comprising an alkali metal salt of tolyltriazole.

5. One-shot foam producing compositions as defined in claim 4 wherein said tertiary amine catalyst further comprises triethylenediamine.

6. One-shot foam producing compositions as defined in claim 4 or 5 wherein said tertiary amine catalyst comprises a solution of potassium tolyltriazole in ethylene glycol.

7. One-shot foam producing compositions as defined in claim 4 or 5 containing as a co-catalyst an organotin compound.

8. In the production of cellular products by reaction of a polyether polyol with organic isocyanate in the presence of blowing agent and tertiary amine catalyst, the improvement which comprises using as all or part of such tertiary amine catalyst an alkali metal salt of an azole compound containing at least two hetero nitrogen atoms.

9. The method as defined in claim 8 wherein said alkali metal salt is potassium tolyltriazole.

10. The method as defined in claims 8 or 9 wherein said tertiary amine catalyst further comprises triethylenediamine.

11. The method as defined in claim 8 or 9 wherein in addition to the tertiary amine catalyst an organotin compound is employed as co-catalyst.

12. The method as defined in claim 8 as applied to the production of polyurethane by the prepolymer method.

13. The method as defined in claim 8 as applied to the production of polyurethane by the one-shot method.

14. The method as defined in claim 8 as applied to the production of polyisocyanurates, wherein said alkali metal salt is that of tolyltriazole employed as a co-catalyst with hydroxypropyltrimethylammonium-2-ethyl hexanoate.

* * * * *